(12) United States Patent
Moon

(10) Patent No.: US 7,961,176 B2
(45) Date of Patent: Jun. 14, 2011

(54) INPUT APPARATUS AND METHOD USING OPTICAL SENSING, AND PORTABLE TERMINAL USING THE SAME

(75) Inventor: Byoung Woo Moon, Gwangju-si (KR)

(73) Assignee: Samsung Electronics Co., Ltd (KR)

( * ) Notice: Subject to any disclaimer, the term of this patent is extended or adjusted under 35 U.S.C. 154(b) by 1086 days.

(21) Appl. No.: 11/586,265

(22) Filed: Oct. 25, 2006

(65) Prior Publication Data

US 2007/0109278 A1 May 17, 2007

(30) Foreign Application Priority Data

Nov. 11, 2005 (KR) .................. 10-2005-0108261

(51) Int. Cl.
*G06F 3/042* (2006.01)
(52) U.S. Cl. ........................................ 345/175
(58) Field of Classification Search .......... 345/156–175; 455/203
See application file for complete search history.

(56) References Cited

U.S. PATENT DOCUMENTS

| | | | | |
|---|---|---|---|---|
| 5,785,439 | A * | 7/1998 | Bowen | 400/472 |
| 5,848,356 | A * | 12/1998 | Jambhekar et al. | 455/403 |
| 6,333,735 | B1 * | 12/2001 | Anvekar | 345/175 |
| 6,429,857 | B1 * | 8/2002 | Masters et al. | 345/175 |
| 2002/0175901 | A1 * | 11/2002 | Gettemy | 345/175 |
| 2003/0174125 | A1 * | 9/2003 | Torunoglu et al. | 345/168 |

FOREIGN PATENT DOCUMENTS

| KR | 1020040056390 | 7/2004 |
|---|---|---|
| KR | 1020050029589 | 3/2005 |

* cited by examiner

*Primary Examiner* — Richard Hjerpe
*Assistant Examiner* — Carolyn R Edwards
(74) *Attorney, Agent, or Firm* — The Farrell Law Firm, P.C.

(57) ABSTRACT

An input apparatus and method in a portable terminal are provided. The input apparatus includes a display unit, having a plurality of pixels; an optical sensing unit for forming a grid of optical signals in a predetermined area corresponding to the pixels of the display unit and producing location information of a pointer in the grid of optical signals; a coordinate converter for converting the location information of the pointer into coordinate information in the display unit and computing a location of a cursor in the display unit on the basis of the coordinate information; and a controller for controlling display of the cursor at the computed location in the display unit, wherein the controller identifies an operation mode of the input apparatus, and operates a portion of the optical sensing unit for key recognition if the operation mode is a key input mode.

25 Claims, 8 Drawing Sheets

INPUT APPARATUS AND METHOD USING OPTICAL SENSING, AND PORTABLE TERMINAL USING THE SAME

PRIORITY

This application claims priority to an application entitled "Input Apparatus an Method Using Optical Sensing, And Portable Terminal Using the Input Apparatus and Method" filed in the Korean Intellectual Property Office on Nov. 11, 2005 and assigned Serial No. 2005-108261, the contents of which are incorporated herein by reference.

BACKGROUND OF THE INVENTION

1. Field of the Invention

The present invention relates generally to an input apparatus and input method thereof and, more particularly, to an input apparatus and method using optical sensing, and to a portable terminal using the input apparatus and method.

2. Description of the Related Art

Along with recent advances in communication technology, a variety of portable terminals such as personal digital assistants (PDAs) and mobile phones have been developed and are in widespread use. From the viewpoint of user interfaces, particularly input apparatuses, various types of user interfaces including keypads having hardware buttons and soft keypads using touch screens have been applied to the portable terminals.

Such a conventional user interface normally includes mechanical elements attached to the base of a portable terminal. That is, desired signals are input through touching particular surfaces or elements.

FIG. 1 is a view illustrating a portable terminal having a conventional input apparatus. The portable terminal 100 of FIG. 1 is a slide-type phone comprising a main body 120 and a sub-body 110 slidable on the main body 120. Referring to FIG. 1, in the conventional portable terminal 100, a keypad 121 serving as a main input apparatus is installed in the main body 120. Thus, the main body 120 is configured to have a given thickness and volume to process input signals from the keypad 121.

The conventional user interface including a mechanical element such as a hardware keypad or touch pad at the base of a portable terminal significantly increases the thickness and size of a portable terminal, thus limiting miniaturization of the portable terminal.

SUMMARY OF THE INVENTION

The present invention has been made in view of the above problems, and an object of the present invention is to provide an input apparatus and method capable of minimizing the thickness and size of a portable terminal, and to provide a portable terminal using the input apparatus and method.

Another object of the present invention is to provide an input apparatus and method in a portable terminal having no separate contact surface for inputting signals.

A further object of the present invention is to provide an input apparatus and method in a portable terminal using optical sensing.

In order to achieve the objects, the present invention provides an input apparatus in a portable terminal including a display unit having a plurality of pixels; an optical sensing unit for forming a grid of optical signals in a predetermined area corresponding to the pixels of the display unit and producing location information of a pointer in the grid of optical signals; a coordinate converter for converting the location information of the pointer into coordinate information in the display unit and computing a location of a cursor in the display unit on the basis of the coordinate information; and a controller for controlling display of the cursor at the computed location in the display unit.

Preferably, the optical sensing unit includes a plurality of optical sensors each having a signal emitting part for emitting an optical signal and a signal receiving part for receiving the emitted optical signal; the optical signals from some of the signal emitting parts make 90 degree angles with the optical signals from the rest; and each of the signal receiving parts is installed facing a corresponding signal emitting part so as to receive an optical signal from the corresponding signal emitting part.

The input apparatus may further include a sensor information storage for storing operation control information of the optical sensors to operate the optical sensors according to an input mode of the input apparatus.

Preferably, when the input mode of the input apparatus is a cursor input mode, the sensor information storage is used to operate the optical sensors to form a grid of optical signals corresponding to the pixels of the display unit; and when the input mode is a key input mode, the sensor information storage is used to operate the optical sensors to form a grid of optical signals corresponding to a soft keypad displayed on the display unit.

In accordance with the invention, there is provided an input method for an input apparatus, the input apparatus having an optical sensing unit for forming a grid of optical signals in a predetermined area corresponding to pixels of a display unit and for producing location information of a pointer in the grid of optical signals, the input method including identifying an operation mode of the input apparatus; if the operation mode is a key input mode, operating optical sensors for key recognition; displaying a soft keypad on the display unit; identifying an input location in response to a user input signal; finding a key value corresponding to the identified input location; and processing the found key value.

The input method may further include, if the operation mode is a cursor input mode, operating the optical sensors for cursor recognition; displaying a cursor wait screen on the display unit; identifying an input location in response to a user input signal; computing coordinate values corresponding to the identified input location and finding a pixel corresponding to the coordinate values; and changing a color of the found pixel.

In accordance with the invention, there is provided a portable terminal including a main body; a sub-body, the sub-body being slidably movable along the main body; and an input apparatus, the input apparatus including a display unit installed on the main body, a hot-key input section installed on the main body, and an optical sensing unit, the optical sensing unit having a plurality of optical sensors installed in an optical emitting section and an optical receiving section.

The sub-body may include the optical emitting section for emitting optical signals such that the optical signals make a grid of optical signals over a predetermined area of the sub-body.

Preferably, the optical emitting section includes signal emitting parts of the optical sensors installed on the sub-body, the signal emitting parts emitting the optical signals in response to a control signal of the portable terminal triggered by movement of the sub-body such that the optical signals from the signal emitting parts installed on one side of the sub-body make 90-degree angles with the optical signals from the signal emitting parts installed on another side.

The portable terminal may further includes a coordinate converter for converting location information of a pointer in the grid of optical signals into coordinate information in the display unit and computing a location of a cursor in the display unit on the basis of the coordinate information; and a controller for controlling display of the cursor at the computed location in the display unit.

The portable terminal may also include a sensor information storage for storing operation control information of the optical sensors to operate the optical sensors according to an input mode of the portable terminal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF PREFERRED EMBODIMENTS

Figure 1:
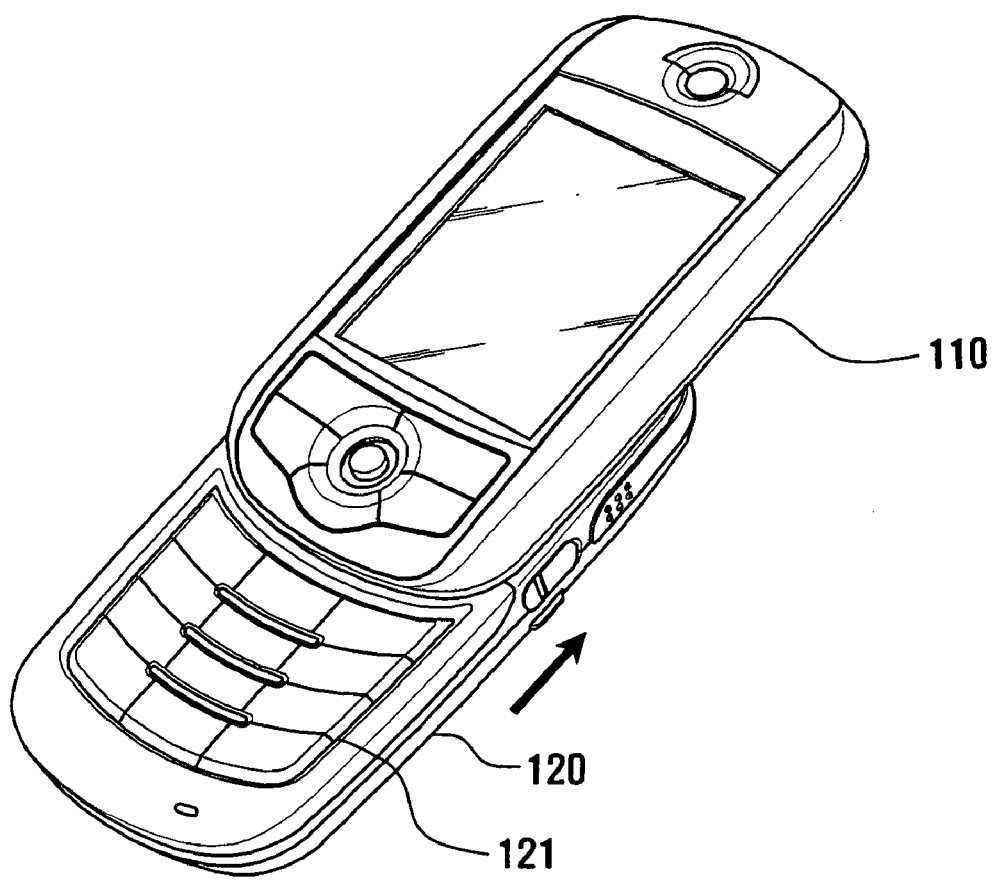
FIG. 1 illustrates a portable terminal having a conventional input apparatus.

Hereinafter, preferred embodiments of the present invention will be described in detail with reference to the accompanying drawings. The same reference symbols identify the same or corresponding elements in the drawings. Some constructions or processes known in the art are not described to avoid obscuring the invention in unnecessary detail.

Figure 2:
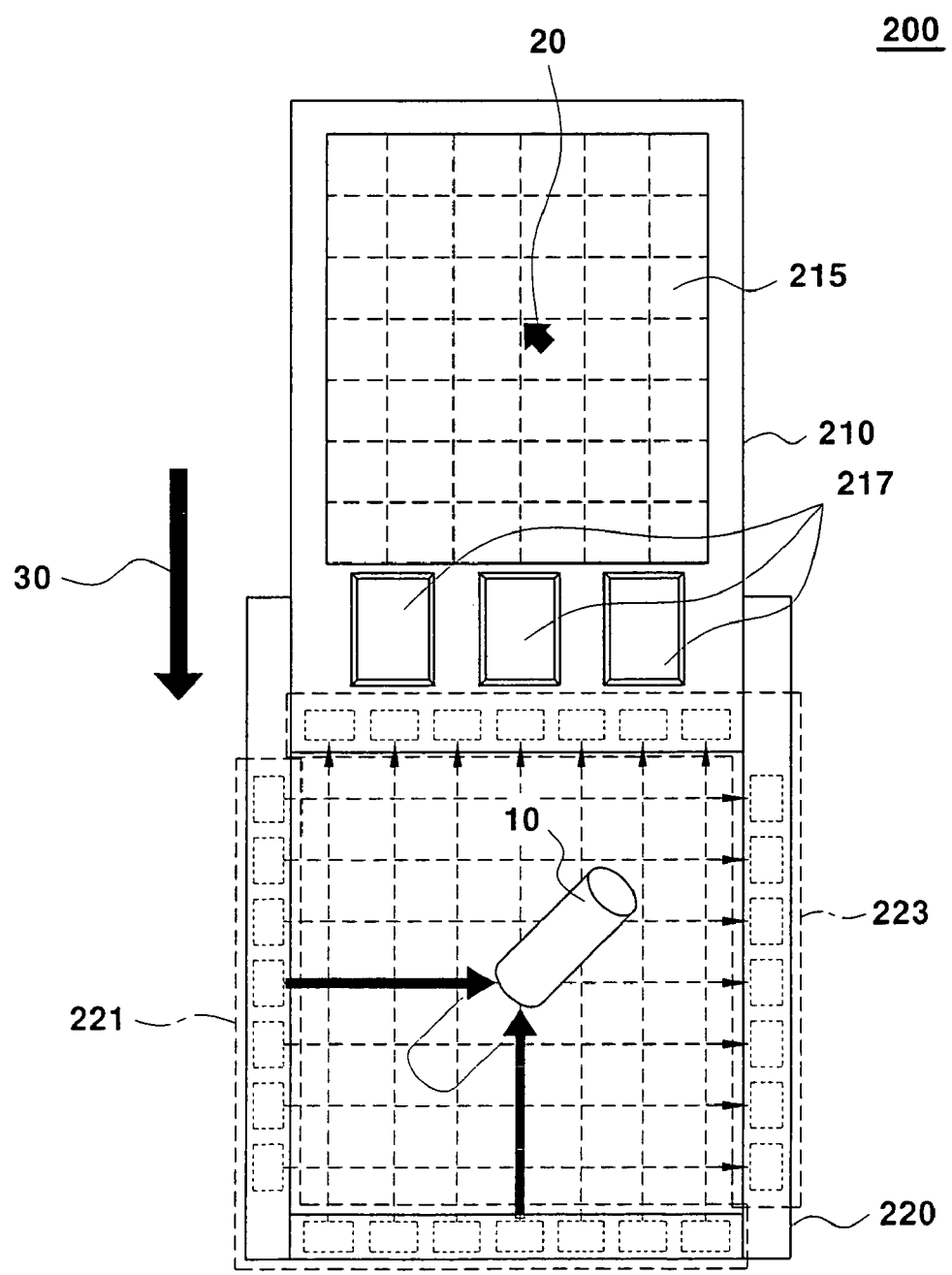
FIG. 2 is a schematic view showing a portable terminal having an input apparatus according to the present invention.

FIG. 2 is a schematic view showing a portable terminal having an input apparatus according to the present invention. Referring to FIG. 2, the portable terminal 200 comprises a main body 210, a sub-body 220, and an input apparatus. The input apparatus includes a display unit 215 (for example, a liquid crystal display (LCD)) installed on the main body 210, a hot-key input section 217 installed on the main body 210, and an optical sensing unit having a plurality of optical sensors installed in an optical emitting section 221 and an optical receiving section 223. It is preferable that the sub-body 220 is configured to enclose three sides of the main body 210 and be slidably movable along two opposite sides of these three sides of the main body 210. The sub-body 220 is preferably movable in a direction of, or in an opposite direction to, the thick arrow 30 shown in FIG. 2.

When the sub-body 220 moves in the direction of arrow 30 in FIG. 2, the optical emitting section 221 of the sub-body 220 emits optical signals such that the optical signals can make a grid of signals over a predetermined area defined by three inner sides of the sub-body 220 and an outer side of the main body 210. To this end, it is preferable that the optical emitting section 221 includes signal emitting parts of the optical sensors installed along two adjacent inner sides of the sub-body 220 to emit optical signals in response to a control signal of the portable terminal 200 triggered by the movement of the sub-body 220, whereby the optical signals from the signal emitting parts installed in one of the adjacent inner sides of the sub-body 220 make 90-degree angles with the optical signals from the signal emitting parts installed in the other side. The optical receiving section 223, provided in the sides opposite to those of the optical emitting section 221 (a remaining inner side of the sub-body 220 and the outer side of the main body 210), receives the emitted optical signals. To this end, it is preferable that the optical receiving section 223 includes signal receiving parts of the optical sensors.

The optical signals from the optical emitting section 221 preferably form small rectangular regions in the predetermined area corresponding to pixels of the display unit 215.

When a user's finger or a stick (hereinafter, referred to as a pointer 10) is placed at a location in the predetermined area, a cursor 20 is displayed at a location of the display unit 215 corresponding to the location of the pointer 10 through interaction between the optical emitting section 221 and optical receiving section 223. For example, the portable terminal 200 may identify identification numbers of those signal receiving parts that do not receive optical signals, determine coordinates in the display unit 215 on the basis of location information of the signal receiving parts, and display the cursor at the determined coordinates.

As apparent from the above description, an input apparatus according to the present invention identifies location information of a pointer in a grid of optical signals from two directions forming a 90-degree angle, computes the corresponding location of a cursor in a display unit (for example, LCD), and displays the cursor at the computed location in the display unit. In addition, the input apparatus tracks movement of the pointer and moves the cursor to a corresponding location in the display unit.

Figure 3:
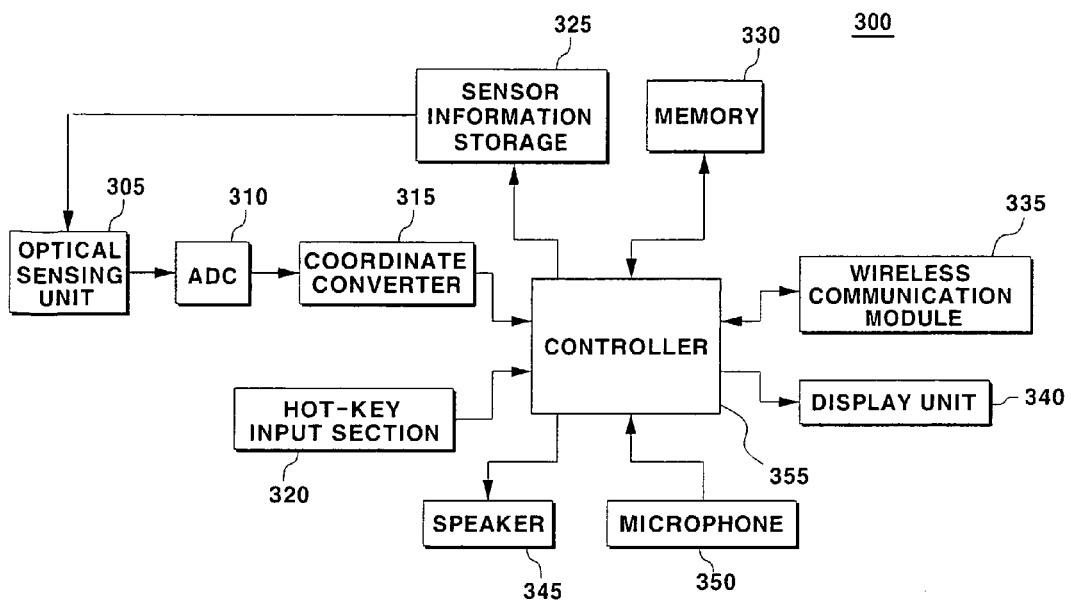
FIG. 3 is a block diagram illustrating a configuration of the portable terminal having the input apparatus according to the present invention.

FIG. 3 is a block diagram illustrating the configuration of the portable terminal having the input apparatus according to the present invention. Referring to FIG. 3, the portable terminal 300 comprises an optical sensing unit 305, an analog/digital converter (ADC) 310, a coordinate converter 315, a hot-key input section 320, a sensor information storage 325, a memory 330, a wireless communication module 335, a display unit 340, a speaker 345, a microphone 350, and a controller 355.

The optical sensing unit 305 includes a plurality of optical sensors, each of which has a signal emitting part for emitting an optical signal and a signal receiving part for receiving the emitted optical signal. The optical sensing unit 305 determines identification numbers of the optical sensors whose signal receiving parts do not receive an optical signal or receive an optical signal having a signal intensity less than or equal to a reference value, and sends the determined identification numbers to the ADC 310. The signal emitting parts and signal receiving parts preferably are installed in the optical sensing unit 305 so as to form a grid of optical signals as described in relation to FIG. 2.

The ADC 310 converts the identification numbers into a digital signal and transmits the converted digital signal to the coordinate converter 315.

The coordinate converter 315 converts location information of the pointer in the grid of optical signals formed in the optical sensing unit 305 into coordinate values of the display unit 340. The coordinate converter 315 preferably stores in advance and manages sensor-related information concerning locations of the respective optical sensors and coordinate values of the display unit 340 corresponding to the locations of the optical sensors, and computes location information of a cursor of the display unit 340 using the stored sensor-related information and the signal transmitted from the ADC 310.

The hot-key input section 320 is installed on the main body of the portable terminal and inputs hot-key signals for changing operation modes of the portable terminal or performing preset operations.

The sensor information storage 325 stores operation control information of the optical sensors in the optical sensing unit 305. For example, information concerning on/off control of the respective optical sensors may be included in the operation control information. That is, it is preferable that the sensor information storage 325 stores the quantity of optical sensors to be operated and location information thereof corresponding to an operation mode of the portable terminal 300. While it is preferable to form a dense grid of optical signals corresponding to pixels of the display unit 340 in the case where the operation mode of the portable terminal 300 needs cursor inputs (for example, a drawing), it is preferable to form a grid of just enough optical signals for identifying key buttons in the case where the operation mode needs selection of key buttons (for example, input of a telephone number). This information may be used when the sensor information storage 325 stores in advance the operation control information of the optical sensors corresponding to the operation mode of the portable terminal 300. For example, the operation control information of the optical sensors stored in the sensor information storage 325 may be structured such that, while all of the optical sensors are operated when the portable terminal 300 is in an operation mode requiring cursor inputs, only every second optical sensor is operated when the portable terminal 300 is in an operation mode requiring key inputs.

The memory 330 stores information concerning operations of the portable terminal 300, such as driver programs for operation control and data associated therewith, telephone numbers and address records, and short messages.

The wireless communication module 335 provides a communication interface with wireless networks; for example for control of data communication.

The display unit 340 displays an image corresponding to screen display information transmitted from the controller 355. For example, the display unit 340 receives, from the controller 355, coordinate information of the display unit 340 corresponding to location information of the pointer in the grid of optical signals, and displays the cursor at the corresponding coordinates.

According to control of the controller 355, the speaker 345 outputs an acoustic signal, and the microphone 350 receives an acoustic signal from the surrounding environment (for example, a voice of the user) and transmits the received acoustic signal to the controller 355.

The controller 355 controls the portable terminal 300 using signals input through a user interface or operational programs pre-stored in the memory 330. In FIG. 3, the user interface includes the optical sensing unit 305, ADC 310, and coordinate converter 315.

Figure 4:
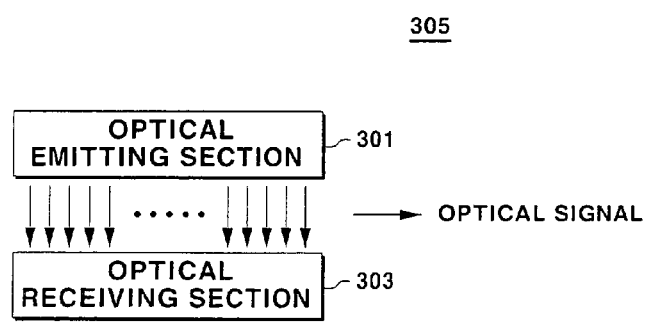
FIG. 4 is a schematic block diagram illustrating an optical sensing unit according to the present invention.

FIG. 4 is a schematic block diagram illustrating the optical sensing unit 305 of FIG. 3 according to the present invention. Referring to FIG. 4, the optical sensing unit 305 includes an optical emitting section 301 and an optical receiving section 303. It is preferable that the optical emitting section 301 and optical receiving section 303 are installed so as to leave an appropriate space therebetween for forming a predetermined optical sensing area. It is illustrated in FIG. 4 that the optical emitting section 301 and optical receiving section 303 are formed in linear relation and an optical sensing area is formed therebetween. However, as shown in FIG. 2, it is preferable to configure the optical emitting section 301 and optical receiving section 303 each in the form of two adjacent sides of a rectangle, thereby shaping the optical sensing area like a rectangle corresponding to the shape of the display unit.

Figure 5:
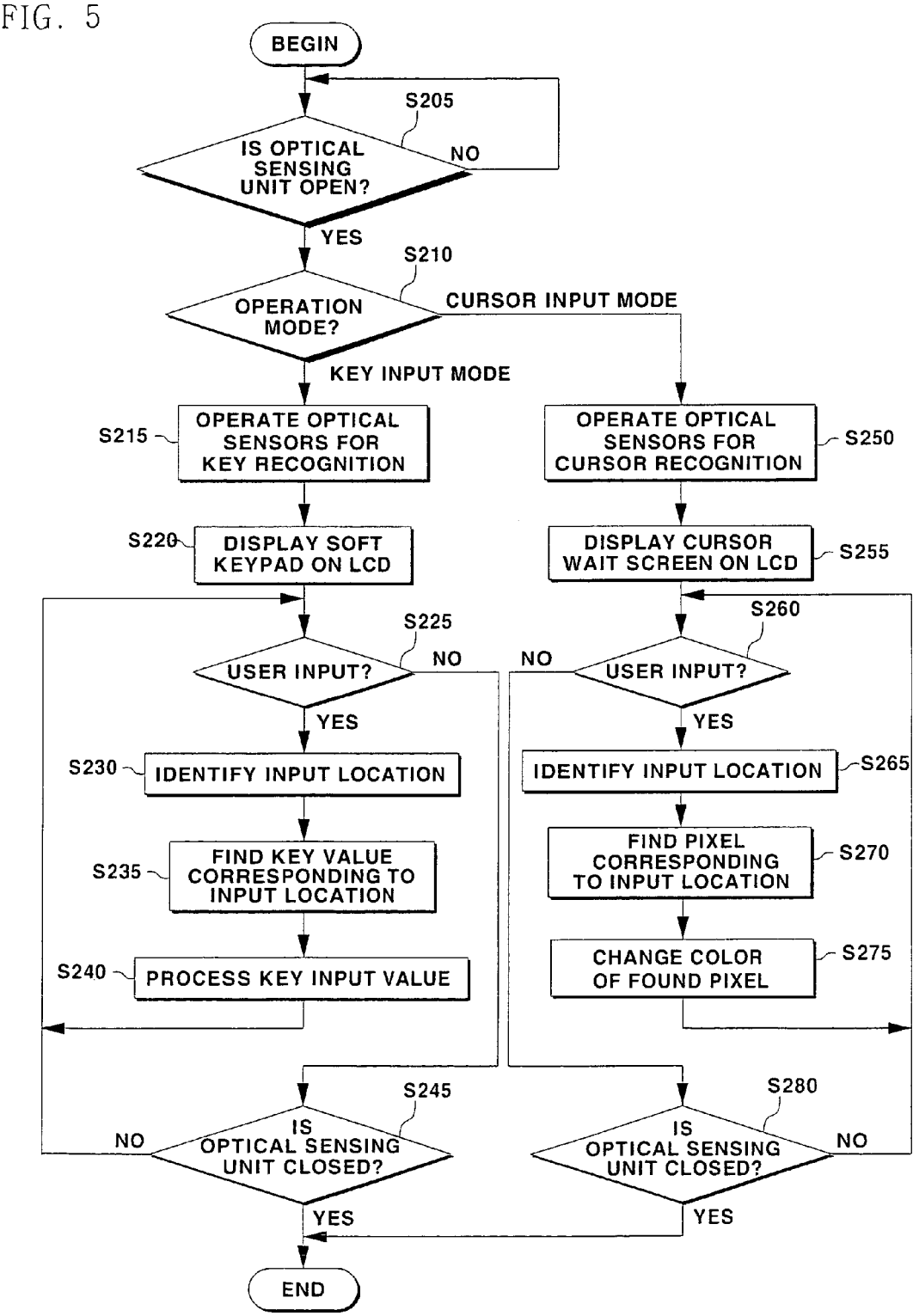
FIG. 5 is a flow chart illustrating an input method according to the present invention.

FIG. 5 is a flow chart illustrating an input method using the input apparatus according to the present invention. First, when the optical sensing unit provided in the input apparatus is opened at step S205, the input apparatus identifies the current operation mode at step S210. That is, it is determined whether the operation mode of the input apparatus is a key input mode or a cursor input mode. Here, the key input mode is an operation mode for key button inputs, for example, to input a telephone number, and the cursor input mode is for inputting cursor movement information, for example, to draw a picture.

If the operation mode of the input apparatus is determined to be the key input mode at step S210, the input apparatus operates the optical sensors for key recognition at step S215. That is, among the optical sensors arranged in the optical sensing unit, only selected ones sufficient for key recognition are operated. For example, it is preferable to operate every other one of the optical sensors in the key input mode, and to store this sensor operation information in advance at a location of the portable terminal.

A soft keypad is then displayed on the display unit (for example, an LCD) at step S220.

If a user signal is input at step S225 at a location in the optical sensing area generated by the optical sensors in operation, the portable terminal identifies at step S230 the input location, and extracts a key value corresponding to the identified input location at step S235. Prior to step S235, it is preferable to store in advance location information of a plurality of key buttons contained in the soft keypad. Thus, at step S235, the key value corresponding to the input location may be extracted by comparing the input location identified at step S230 to the pre-stored location information of the key buttons.

Key input information corresponding to the extracted key value is then processed at step S240. For example, in an operation of inputting a telephone number, the corresponding key value is displayed on the display unit, and in an operation of selecting an icon related with a specific function, the corresponding function is performed.

After processing of the key input information at step S240, if no further user signal is input at step S225 and if the optical sensing unit is closed at step S245, operations in the key input mode are ended.

On the other hand, if at step S210 the operation mode of the input apparatus is determined to be the cursor input mode, the input apparatus operates the optical sensors for cursor recognition at step S250. That is, among the optical sensors arranged in the optical sensing unit, only selected ones sufficient for cursor recognition are operated. For example, it is preferable to operate all of the optical sensors for high-precision sensing in the case of cursor recognition, and to store this sensor operation information in advance at a location of the portable terminal.

The input apparatus displays a cursor wait screen on the display unit (for example, an LCD) at step S255, and waits for a user input.

If a user signal is input at a location in the optical sensing area generated by the optical sensors in operation at step S260, the portable terminal identifies the input location at step S265, and determines an LCD pixel corresponding to the identified input location at step S270. To this end, it is preferable that the input apparatus includes the coordinate converter 315 described in relation to FIG. 3, computes coordinate values corresponding to the location of the user signal input using the coordinate converter 315, and determines the LCD pixel corresponding to the computed coordinate values.

The input apparatus then changes the color of the determined LCD pixel at step S275. For example, the color of the LCD pixel may be changed to a complement color of the background color of the display unit or to a particular color pre-selected by the user. After step S275, if no further user signal is input at step S260 and if the optical sensing unit is closed at step S280, operations in the cursor input mode are ended.

Figure 6A:
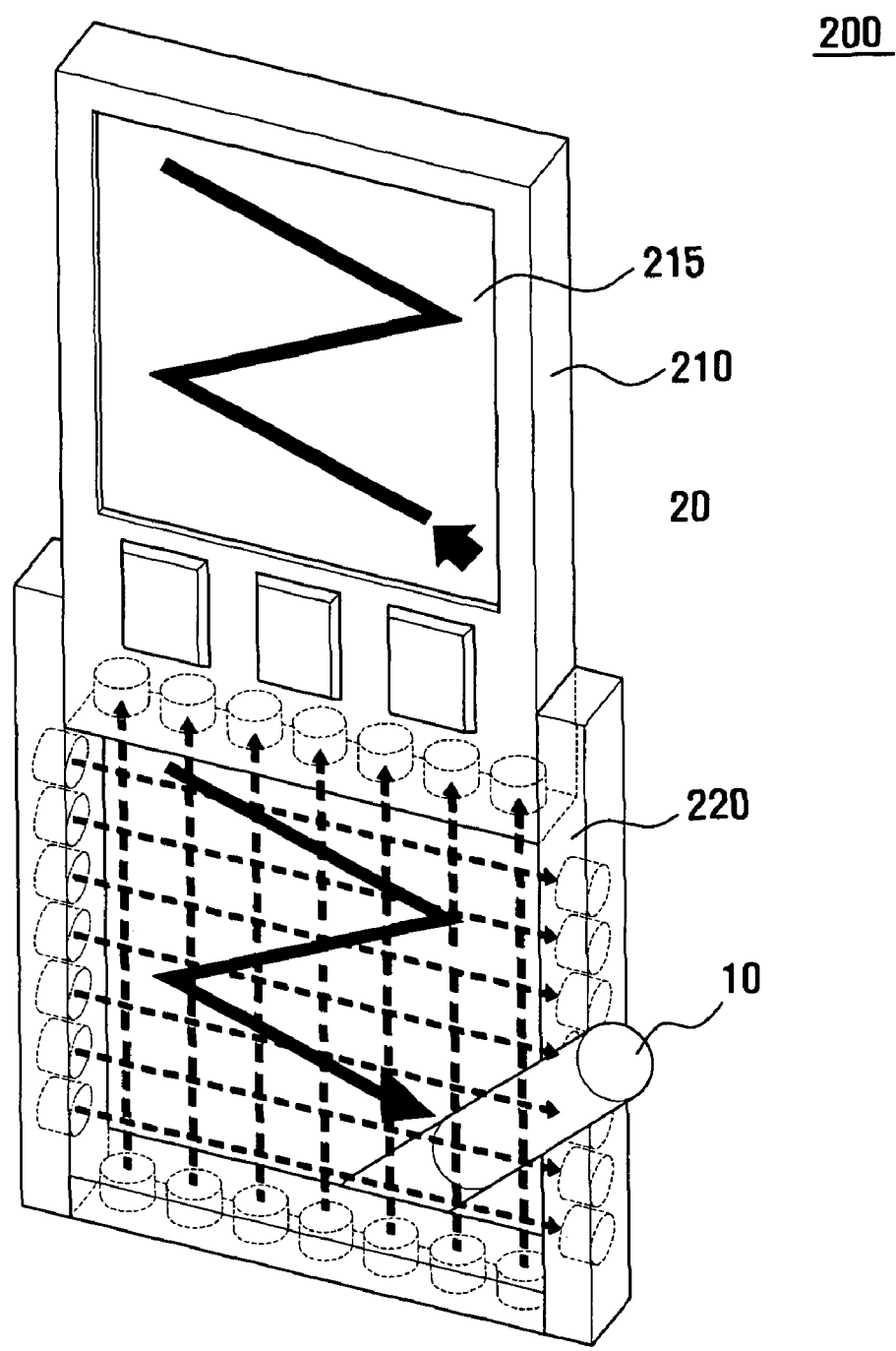
FIGS. 6A through 6D are views illustrating usage states of the portable terminal using the input apparatus according to the present invention.
Figure 6B:
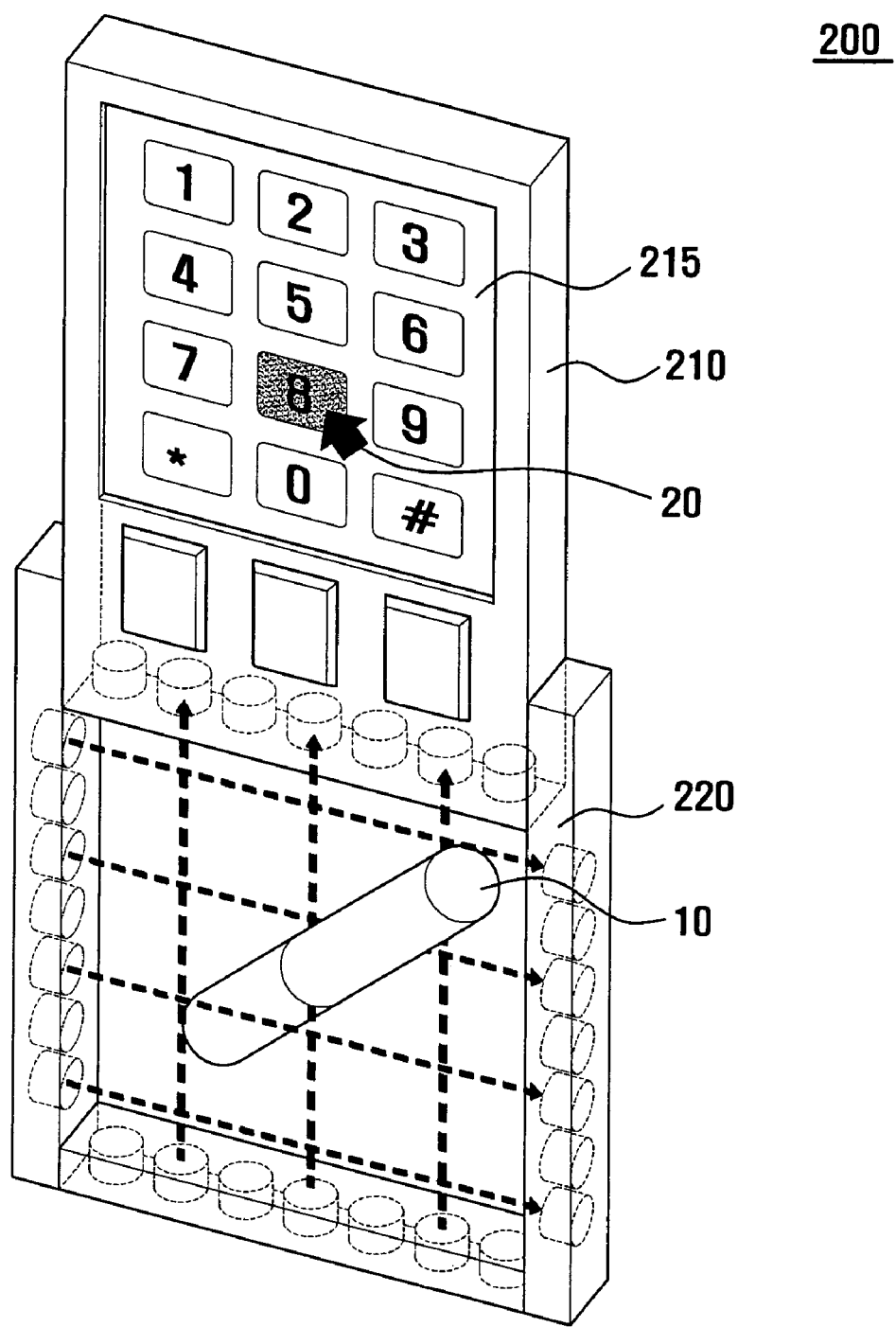
Figure 6C:
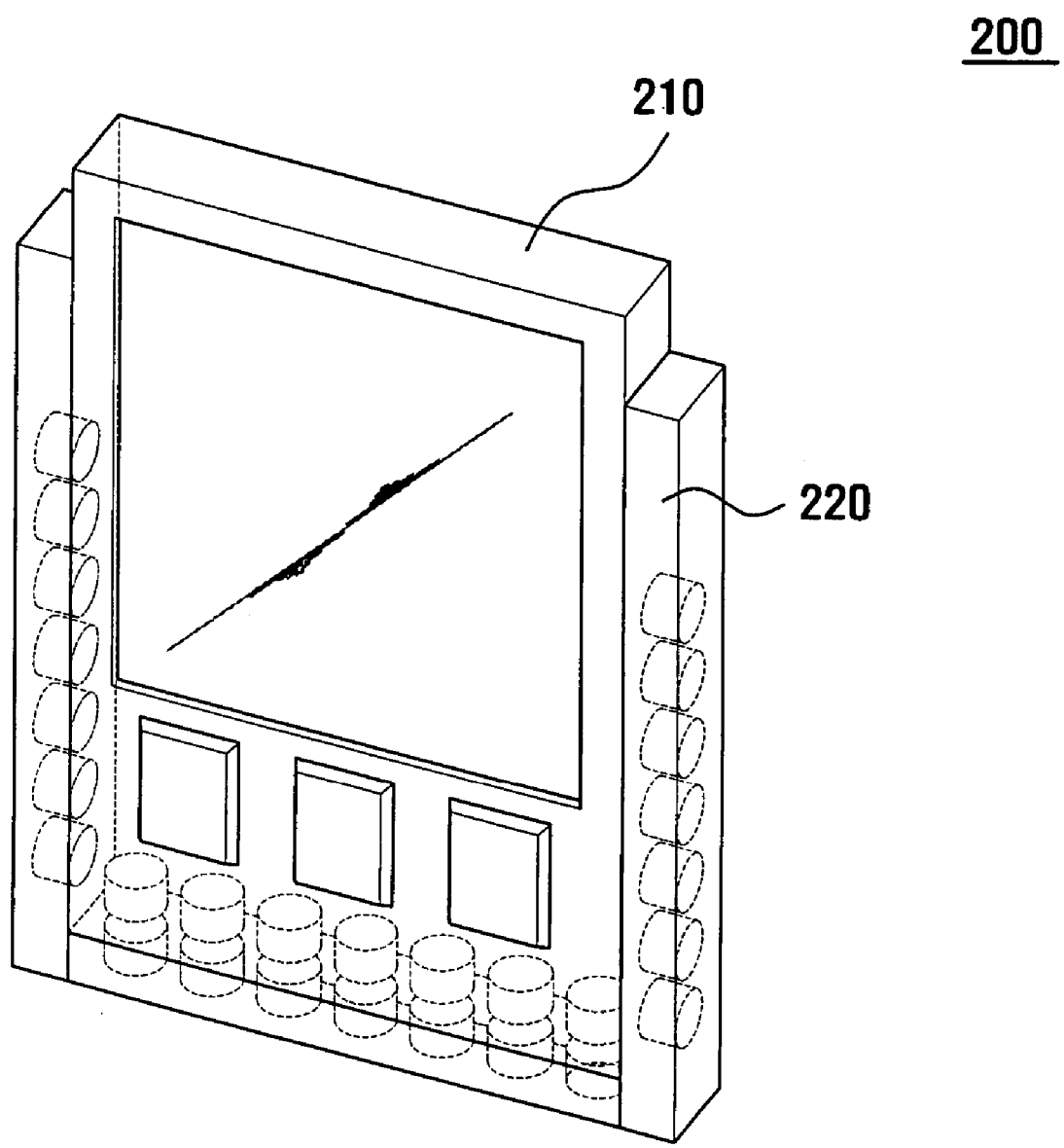
Figure 6D:
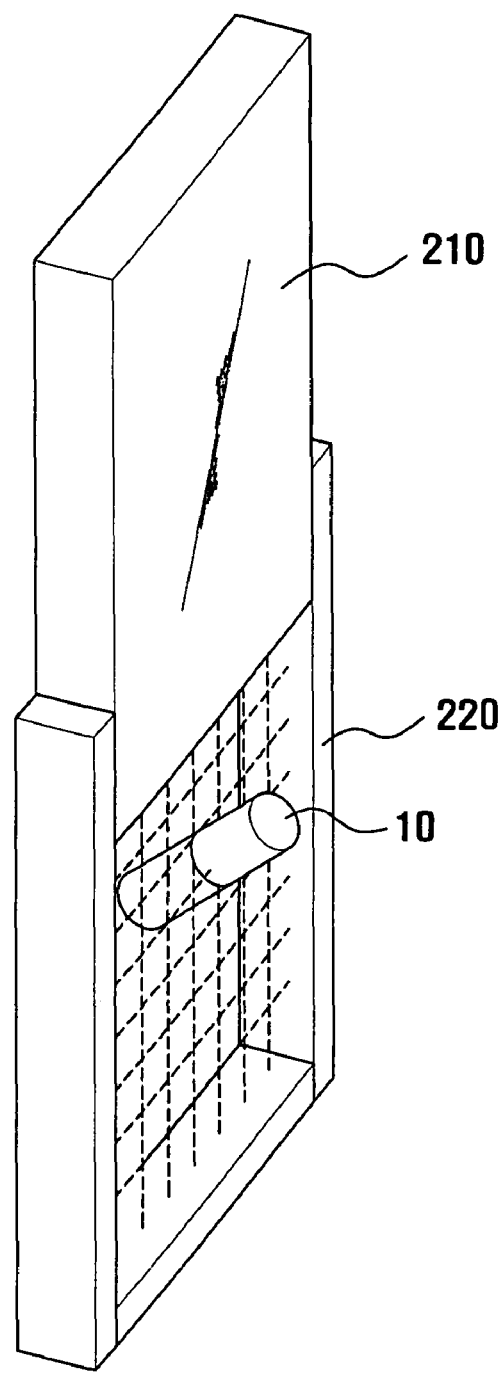

FIGS. 6A through 6D are views illustrating usage states of a portable terminal having the input apparatus according to the present invention. FIG. 6A shows the portable terminal 200 in the state when the input apparatus is operational in a cursor input mode. FIG. 6B shows the portable terminal 200 in the state when the input apparatus is operational in a key input mode. FIG. 6C shows the portable terminal 200 in the state when an optical sensing unit is closed. FIG. 6D shows the rear side of the portable terminal 200.

Referring to FIG. 6A, when the input apparatus of the portable terminal 200 is operational in the cursor input mode, a cursor 20 and a movement path thereof displayed on a display unit 215 of a main body 210 correspond to a pointer 10 and a movement path thereof in a grid of optical signals enclosed by the main body 210 and a sub-body 220. Here, the optical signals are densely spaced in the grid of optical signals for high-precision sensing of the location of the pointer 10.

Referring to FIG. 6B, when the input apparatus of the portable terminal 200 is operational in the key input mode, a soft keypad is displayed on the display unit 215 of the main body 210. It can be understood that, in the grid of optical signals enclosed by the main body 210 and sub-body 220, the optical signals are less densely spaced in comparison to those of FIG. 6A. This is because it is sufficient to have a level of precision just precise enough for identification of a key button on the soft keypad when the input apparatus of the portable terminal 200 is operational in the key input mode. In FIG. 6B, it is illustrated that the pointer 10 is placed at a location in the grid of optical signals corresponding to a key button labeled '8' in the soft keypad, and the cursor is thus displayed on the key button labeled '8' in the soft keypad.

Referring to FIGS. 6C and 6D, it can be understood that the portable terminal 200 using the input apparatus according to the present invention does not include a separate mechanical device for inputting key signals, and thus is configured to be slimmer and more compact in comparison to a conventional portable terminal.

As apparent from the above description, the present invention provides an input apparatus and method thereof, and a portable terminal using the input apparatus and method wherein no separate contact surface is used for inputting signals, thereby minimizing a thickness and size of the portable terminal.

While preferred embodiments of the present invention have been shown and described in this specification, it will be understood by those skilled in the art that various changes or modifications of the embodiments are possible without departing from the spirit and scope of the invention as defined by the appended claims.

What is claimed is:

1. An input apparatus for a portable terminal, comprising:
a display unit, having a plurality of pixels;
an optical sensing unit for forming a grid of optical signals in a predetermined area corresponding to the pixels of the display unit and producing location information of a pointer in the grid of optical signals;
a coordinate converter for converting the location information of the pointer into coordinate information in the display unit and computing a location of a cursor in the display unit on the basis of the coordinate information; and
a controller for controlling display of the cursor at the computed location in the display unit,
wherein the controller identifies an operation mode of the input apparatus, and operates only a portion of the optical sensing unit for key recognition if the identified operation mode is a key input mode.

2. The input apparatus of claim 1, wherein:
the optical sensing unit includes a plurality of optical sensors each having a signal emitting part for emitting an optical signal and a signal receiving part for receiving the emitted optical signal;
the optical signals from a portion of the signal emitting parts forming 90 degree angles with the optical signals from the remaining signal emitting parts; and
each of the signal receiving parts is installed facing a corresponding signal emitting part so as to receive an optical signal from the corresponding signal emitting part.

3. The input apparatus of claim 2, further comprising a sensor information storage for storing operation control information of the optical sensors to operate the optical sensors according to the operation mode of the input apparatus.

4. The input apparatus of claim 3, wherein the controller operates all of the optical sensors to form a grid of optical signals corresponding to the pixels of the display unit when the operation mode of the input apparatus is a cursor input mode.

5. The input apparatus of claim 3, wherein the controller operates the portion of the optical sensors for key recognition to form a grid of optical signals corresponding to a soft keypad displayed on the display unit when the operation mode of the input apparatus is the key input mode.

6. The input apparatus of claim 1, wherein the controller displays a cursor wait screen on the display unit and changes a color of a pixel corresponding to the location of the cursor when the operation mode of the input apparatus is a cursor input mode.

7. The input apparatus of claim 1, wherein the controller displays a soft keypad for key input on the display unit when the operation mode of the input apparatus is the key input mode.

8. An input method for an input apparatus, the input apparatus having an optical sensing unit for forming a grid of optical signals in a predetermined area corresponding to pixels of a display unit and for producing location information of a pointer in the grid of optical signals, wherein the optical sensing unit includes a plurality of optical sensors, the input method comprising the steps of:
a) identifying an operation mode of the input apparatus;
b) if the operation mode is a key input mode, operating only a portion of the optical sensors for key recognition;
c) displaying a soft keypad on the display unit;
d) identifying an input location in response to a user input signal;
e) finding a key value corresponding to the identified input location; and
f) processing the found key value.

9. The input method of claim 8, wherein step b) includes operating the portion of the optical sensors for key recognition so as to form a grid of optical signals corresponding to the soft keypad.

10. The input method of claim 8, wherein step f) includes, in a numerical input operation of the input apparatus, displaying the key value on the display unit.

11. The input method of claim 8, wherein step f) further includes, in an icon selection operation of the input apparatus, performing a function related with a selected icon.

12. The input method of claim 8, further comprising, if the operation mode is a cursor input mode, the steps of:
   g) operating all of the optical sensors for cursor recognition;
   h) displaying a cursor wait screen on the display unit;
   i) identifying an input location in response to a user input signal;
   j) computing coordinate values corresponding to the identified input location and finding a pixel corresponding to the coordinate values; and
   k) changing a color of the found pixel.

13. The input method of claim 12, wherein step g) includes operating all of the optical sensors of the optical sensing unit so as to form the grid of optical signals corresponding to the pixels of the display unit.

14. A portable terminal comprising:
   a main body;
   a sub-body being slidably movable on the main body; and
   an input apparatus including a display unit installed on the main body, a hot-key input section installed on the main body, and an optical sensing unit, the optical sensing unit having a plurality of optical sensors installed in an optical emitting section and an optical receiving section,
   wherein the input apparatus operates a only portion of the optical sensors if the operation mode of the input apparatus is a key input mode.

15. The portable terminal of claim 14, wherein the sub-body is configured to enclose three sides of the main body, and is slidable along two opposite sides of the three sides.

16. The portable terminal of claim 15, wherein the sub-body includes the optical emitting section for emitting optical signals such that the optical signals define a grid of optical signals over a predetermined area defined by three inner sides of the sub-body and an outer side of the main body.

17. The portable terminal of claim 15, wherein the optical emitting section includes signal emitting parts of the optical sensors installed along two adjacent inner sides of the sub-body, the signal emitting parts emitting optical signals in response to a control signal of the portable terminal triggered by movement of the sub-body such that the optical signals from the signal emitting parts installed in one of the adjacent inner sides of the sub-body form 90 degree angles with the optical signals from the signal emitting parts installed in the other inner side.

18. The portable terminal of claim 16, further comprising:
   a coordinate converter for converting location information of a pointer in the grid of optical signals into coordinate information in the display unit and computing a location of a cursor in the display unit on the basis of the coordinate information; and
   a controller for controlling display of the cursor at the computed location in the display unit.

19. The portable terminal of claim 18, further comprising a sensor information storage for storing operation control information of the optical sensors to operate the optical sensors according to the operation mode of the input apparatus.

20. The portable terminal of claim 19, wherein the sensor information storage is used to operate all of the optical sensors to form the grid of optical signals corresponding to pixels of the display unit when the operation mode of the input apparatus is a cursor input mode.

21. The portable terminal of claim 19, wherein the sensor information storage is used to operate the portion of the optical sensors to form the grid of optical signals corresponding to a soft keypad displayed on the display unit when the operation mode of the input apparatus is the key input mode.

22. The portable terminal of claim 18, wherein the controller displays a cursor wait screen on the display unit and changes a color of a pixel corresponding to the location of the cursor when the operation mode of the input apparatus is a cursor input mode.

23. The portable terminal of claim 18, wherein the controller displays a soft keypad for a key input on the display unit when the operation mode of the input apparatus is the key input mode.

24. An input method for an input apparatus, the input apparatus having an optical sensing unit for forming a grid of optical signals in a predetermined area corresponding to pixels of a display unit and for producing location information of a pointer in the grid of optical signals, the optical sensing unit having a plurality of optical sensors installed in an optical emitting section and an optical receiving section, the input method comprising the steps of:
   a) identifying an operation mode of the input apparatus;
   b) if the operation mode is a cursor input mode, operating all of the optical sensors for cursor recognition;
   c) displaying a cursor wait screen on the display unit;
   d) identifying an input location in response to a user input signal;
   e) computing coordinate values corresponding to the identified input location and finding a pixel corresponding to the coordinate values;
   f) changing a color of the found pixel;
   g) if the operation mode is a key input mode, operating only a portion of the optical sensors for key recognition;
   h) displaying a soft keypad on the display unit;
   i) identifying an input location in response to a user input signal;
   j) finding a key value corresponding to the identified input location; and
   k) processing the found key value.

25. The input method of claim 24, wherein step b) includes operating all of the optical sensors of the optical sensing unit so as to form the grid of optical signals corresponding to the pixels of the display unit, and
   wherein step g) includes operating the portion of the optical sensors for key recognition so as to form the grid of optical signals corresponding to a soft keypad displayed on the display unit.

* * * * *